US008101010B2

(12) United States Patent
Clinton et al.

(10) Patent No.: US 8,101,010 B2
(45) Date of Patent: Jan. 24, 2012

(54) GAS SEPARATION MODULE

(75) Inventors: Joel Edward Clinton, Waverly, NY (US); Curtis Robert Fekety, Tioga, PA (US); Yunfeng Gu, Painted Post, NY (US); Zhen Song, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 392 days.

(21) Appl. No.: 12/473,505

(22) Filed: May 28, 2009

(65) Prior Publication Data

US 2010/0300294 A1    Dec. 2, 2010

(51) Int. Cl.
*B01D 53/22* (2006.01)
*B01D 65/00* (2006.01)

(52) U.S. Cl. .................... 95/45; 96/11; 55/523; 428/116

(58) Field of Classification Search ............ 96/4, 11–13; 95/43, 45, 51, 54, 55; 55/523, 524; 428/116
See application file for complete search history.

(56) References Cited

U.S. PATENT DOCUMENTS

| | | | |
|---|---|---|---|
| 4,533,584 A * | 8/1985 | Takeuchi et al. .............. 428/116 |
| 5,021,204 A * | 6/1991 | Frost et al. ..................... 264/630 |
| 5,223,318 A * | 6/1993 | Faber et al. .................... 428/116 |
| 5,415,772 A * | 5/1995 | Garcera et al. ................ 210/232 |
| 5,855,781 A * | 1/1999 | Yorita et al. ............. 210/321.82 |
| 6,716,275 B1 | 4/2004 | Reed et al. ......................... 96/10 |
| 7,517,379 B2 * | 4/2009 | Sorensen, Jr. ................... 55/523 |
| 2002/0179519 A1 | 12/2002 | Yorita et al. ............. 210/321.73 |
| 2005/0173332 A1 | 8/2005 | Hidaka ......................... 210/348 |
| 2008/0237919 A1 | 10/2008 | Liu et al. ..................... 264/176.1 |
| 2008/0299349 A1 | 12/2008 | Gu et al. ........................ 428/137 |
| 2008/0299377 A1 | 12/2008 | Gu et al. ...................... 428/307.7 |
| 2009/0000475 A1 | 1/2009 | Fekety et al. .................... 95/105 |
| 2009/0107330 A1 | 4/2009 | Gu ................................... 95/55 |
| 2010/0006503 A1 * | 1/2010 | Bratton et al. ................ 210/650 |

FOREIGN PATENT DOCUMENTS

| | | |
|---|---|---|
| EP | 1 457 250 | 9/2004 |
| EP | 1704909 | 9/2006 |
| WO | 00/50156 | 8/2000 |
| WO | 2008/073417 | 6/2008 |
| WO | 2008/106028 | 9/2008 |

OTHER PUBLICATIONS

Teraoka, et al; "Fe-based perovskite-type oxides as excellent oxygen-permeable and reduction-tolerant materials"; ScienceDirect; Solid State Ionics 177 (2006) 2245-2248.
Zhang et al; "Preparation and characterization of mixed-conducting thin tubular membrane"; ScienceDirect; Journal of Membrane Science 299 (2007) 261-267.
Gu et al; "Ultrathin, hydrogen-selective silica membranes deposited on alumina-graded structures prepared from size-controlled boehmite sols"; ScienceDirect; Journal of Membrane Science 306 (2007); 216-227.
Lu et al; "Oxygen permeability and improved stability of a permeable Zr-substituted perovskite membrane for air separation"; Materials Science and Engineering B 141 (2007) 55-60.

(Continued)

*Primary Examiner* — Frank Lawrence, Jr.
(74) *Attorney, Agent, or Firm* — Joseph M. Homa (57) ABSTRACT

A porous structure sealed at both ends for use in a gas separation module; and a method for separating components of a gas stream.

21 Claims, 4 Drawing Sheets

OTHER PUBLICATIONS

Haag et al; "Pure nickel coating on a mesoporous alumina membrane: preparation by electroless plating and characterization"; ScienceDirect; Surface and Coatings Technology; 201 (2006) 2166-2173.

San et al; "Fabrication of glassy ceramic membrane filters for filtration of spring water with clogging phenomena"; ScienceDirect; Journal of Membrane Science 305 (2007) 169-175.

Yin et al; "Development of oxygen transport membrane $La_{0.2}Sr_{0.8}CoO_{3-\delta}/Co_{0-8}Gd_{0.2}O_{2.8}$ on the tubular $CeO_2$ support"; Science Direct; Applied Catalysis A: General 300 (2006) 75-84.

Yoshino et al; "Development of tubular substrates, silica based membranes and membrane modules for hydrogen separation at high temperature"; Journal of Membrane Science 267 (2005) 8-17.

* cited by examiner

GAS SEPARATION MODULE

FIELD

This disclosure relates to a gas separation module and a porous structure sealed at both ends for use in the gas separation module; and further to a method for separating components of a gas stream.

BACKGROUND

Monolith-type membrane structures using a porous support having an array of parallel channels, typically in a cylindrical form, and a gas selective membrane coated on the inner surface of channel walls, offer a higher surface area packing density than a single-channel tube of the same diameter, leading to higher permeation flux. This results in a dramatic reduction of both the membrane cost per surface area and the engineering costs to assemble large surface areas of membrane modules. The structures can be used to solve significant energy and environmental problems; for example, $H_2$ recovery from waste gas streams, $H_2$ purification from a production gas mixture for fuel cells application, $CO_2$ capture from flue gas streams for sequestration, and other separations. These separation applications often require high temperature for better separation performance.

When a mixture gas stream to be separated is supplied into the channels of a monolith ceramic membrane product, it is separated through the membranes coated on the channel walls, and thereafter passes through pores of the membranes and pores of the support to flow out to an external space. The surface area of two ends of the support exposed to the stream, which includes the end flat surface, and the exterior curved surface of the support, have no membrane coating and therefore need to be sealed with a sealing material in order to prevent the gas stream being treated from passing through the exposed surface area and then pores of the substrate and flowing out of the membrane rod. Separation function could not be achieved without seal coating on the end portion. For separation to occur it is necessary for the gas stream to enter the channels and flow through the channel walls and the outer porous wall of the substrate.

When low-temperature sealant materials such as epoxy or silicone are used, the two ends of the membrane rod must be extended to a low temperature region in order to avoid degradation of the sealant material. This means that some part of membrane is exposed to low temperature, leading to reduction of overall separation performance. US 2005/0173332 disclosed a porous honeycomb filter structure sealed at an end portion for solid/liquid separations, wherein a glass-based sealing material is applied only to the end flat surface by a stamping mechanism with use of a sponge.

Another approach is to use high-temperature sealing material to seal the support onto stainless steel tube or dense alumina tube, so the whole membrane can be exposed at high temperature. H. Lu et al., Materials Science and Engineering B, 141 (2007) pp. 55-60, describe the use of special sealants as high temperature binding agents to seal the perovskite membrane disc onto the stainless steel tube. Y. Gu et al., J. Membr. Sci., 306 (2007) 216-227, describe sealing two ends of the tubular membrane with two dense alumina tubes by a ceramic connection, while C. Zhang et al., J. Membr. Sci., 299 (2007) 261-267, used a silver sealing material. Y. Teraoka et al., Solid State Ionics, 177 (2006) 2245-2248, describes the use of a glass ring; a method that is difficult to apply to monolith membrane rods, especially with small size channels. This approach lacks flexibility as result of permanent connection between support and stainless steel or dense ceramic tubes.

Embodiments of the present invention provide techniques for addressing one or more of the packaging seal concerns mentioned above.

SUMMARY

Disclosed herein is a gas separation module that can be used to separate components of a gas stream. This module provides, for example, high temperature gas separations, flexible connections, and the ability to carry out layer deposition and separation performance evaluation conveniently. The design enables exposure of the entire inorganic porous support to a high temperature region, leading to better separation performance. The flexible connections described allow for easy assembly in a gas separation module.

One embodiment is an article comprising an inorganic porous support having a selected length, an inlet end, an outlet end, and a porous outer curved surface between the inlet and outlet ends, wherein the inorganic porous support is in the form of a flow-through substrate having a plurality of channels with inner surfaces extending from the inlet end to the outlet end, one or a plurality of layers of a porous material coating the inner surfaces of the channels of the inorganic porous support; a hermetic coating sealing the inlet end and the outlet end surfaces of the inorganic porous support; and a hermetic coating sealing the outer curved surface of the inorganic porous support to a selected distance from each of the inlet end and outlet end surfaces.

Another embodiment is an apparatus comprising an inorganic porous support in the form of a flow-through substrate having a porous outer curved surface, a plurality of channels extending from an inlet end to an outlet end, one or a plurality of porous layers coating the inner surfaces of the channels and a selected length; a hermetic coating sealing the inlet end and outlet end surfaces and the outer curved surface of the inorganic porous support to a selected distance from each of the end surfaces; removable fittings with a first end and second end at the inlet end and outlet end of the inorganic porous support; and graphite seals between the hermetic coating on the outer curved surface of the inorganic porous support and the first end or second end of the removable fittings.

A further embodiment is an apparatus comprising an inorganic porous support in the form of a flow-through substrate having a porous outer curved surface, a plurality of channels extending from an inlet end to an outlet end, one or a plurality of porous layers coating the inner surfaces of the channels and a selected length; a cement sealing the inlet end and outlet end surfaces; fittings with a first end and second end at the inlet end and outlet end of the inorganic porous support; and cement seals between the outer curved surface of the inorganic porous support and the first end or second end of the fittings.

A method of separating components of a gas stream comprising any of the embodiments described above, introducing a feed gas into the inorganic porous support via the delivery device; collecting a retentate gas; and collecting a permeate gas, wherein the permeate gas has passed through a non-coated portion of the outer curved surface of the inorganic porous support.

DETAILED DESCRIPTION

One embodiment is an article comprising an inorganic porous support having a selected length, an inlet end, an outlet end, and a porous outer curved surface between the inlet and outlet ends, wherein the inorganic porous support is in the form of a flow-through substrate having a plurality of channels with inner surfaces extending from the inlet end to the outlet end, one or a plurality of layers of a porous material coating the inner surfaces of the channels of the inorganic porous support; a hermetic coating sealing the inlet end and the outlet end surfaces of the inorganic porous support; and a hermetic coating sealing the outer curved surface of the inorganic porous support to a selected distance, L, from each of the inlet end and outlet end surfaces.

In another embodiment, the outer curved surface of the inorganic support is sealed for a distance in the range of 0.5 centimeters to 3 centimeters from each of the inlet end and outlet end surfaces. In another embodiment, the outer curved surface of the inorganic support is sealed for a distance in the range of 1 centimeter to 1.5 centimeters from each of the inlet end and outlet end surfaces.

The term "flow-through substrate" as used herein is a shaped body comprising inner passageways, such as straight or serpentine channels and/or porous networks that would permit the flow of a fluid stream through the body. The flow-through substrate comprises a dimension in the flow-through direction to allow at least a portion of non-coated porous outer curved surface between the hermetic coatings on the outer curved surface of both ends.

Figure 1:
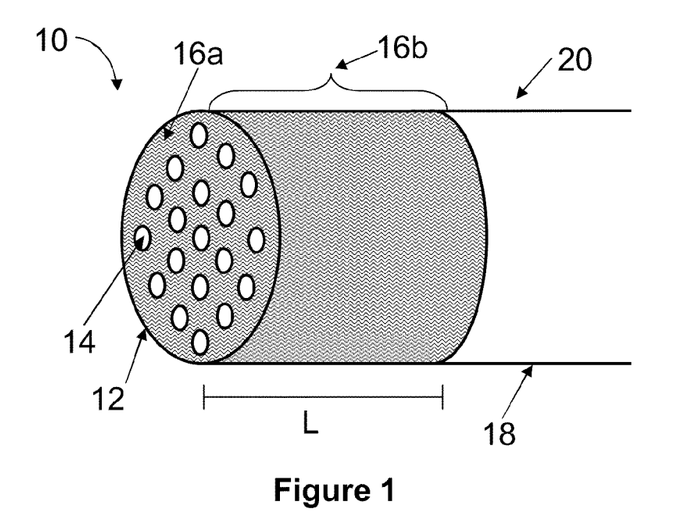
FIG. 1 illustrates one end of an inorganic porous support with a hermetic coating sealing the end surfaces and outer curved surface of the inorganic porous support, according to one embodiment.

FIG. 1 illustrates one embodiment 10 of a coated inorganic porous support; the inorganic porous support 20 is in the form of a honeycomb substrate. In one embodiment the inorganic porous support comprises alumina, cordierite, alpha-alumina, mullite, aluminum titanate, titania, zirconia, zeolite, metal, stainless steel, silica carbide, ceria, or combinations thereof. The inorganic porous substrate can be made using any suitable technique. Honeycomb substrates made from alumina, cordierite, aluminum titanate, zirconia, zeolite, or silica carbide can be manufactured, for example, by extruding a batch material through a die. Other honeycomb substrates such as those made of stainless steel can be made by welding or brazing.

The honeycomb substrate 20 has a plurality of channels 14, end surfaces 12 (only one end surface is illustrated in FIG. 1), a porous curved outer surface 18, and a hermetic coating 16a applied to the end surfaces 12, and a hermetic coating 16b applied to the outer curved surface 18 of the substrate for a selected distance, L, from the end surface 12.

The channels of the inorganic porous support can be any diameter depending on the application. In some embodiments the channels have a median inside diameter of 0.5 millimeters to 3 millimeters, for example, 0.7 millimeters to 0.8 millimeters. The shape of the channels may be any shape, for example, round, square, hexagonal, or oval. For exemplary purposes, round channels are shown in the figures of this application.

The porous walls of the inorganic porous support may comprise, for example, a median pore size of from 1 micron to 25 microns. In one embodiment, the median pore size is from 5 microns to 15 microns.

The inorganic support may have, for example, a porosity of from 20 percent to 65 percent; in one embodiment the porosity is from 35 percent to 50 percent.

One or a plurality of layers of a porous material may be coated on the surfaces of the channels in the inorganic porous support. These porous layers may also be referred to as membranes. The porous layers may be selected from alumina, alpha-alumina, gamma-alumina, zeolite, titania, zirconia, mullite, cordierite, metal, perovskite, palladium, ceria, silica, zeolite, or combinations thereof. The porosity of a porous layer may be a result of spaces between the particles and/or spaces in the material's lattice structure. The pores of a zeolite or silica layer for example are from its lattice channels, typically in the range of 0.3 nanometers to 0.8 nanometers. Porous layers having pore sizes less than 2 nanometers may also be referred to as dense membranes. The pore sizes of the porous layers can range, for example, from 1 micron to less than 200 nanometers, for instance, 0.3 nanometers to 0.8 nanometers, or 0.3 nanometers to 5 nanometers. The outermost porous layer has a pore size of 50 nanometers or less for gas separation applications.

The porous layers may be applied to the surfaces of the channels by flow-coating, chemical vapor deposition, hydrothermal growth, sol-gel method, or combinations thereof, including the application techniques described in US Patent Application Publications 2008/0237919, 2009/0000475, and 2009/0107330.

When a plurality of layers are coating the inner surfaces, the plurality of layers have a decreasing average pore size from the surface of the channel wall to the outermost coating layer. For example, the average pore sizes of the porous layers can progressively decrease from 1 micron to less than 200 nanometers as one moves further away from the channel wall to the outermost coating layer.

Figure 2:
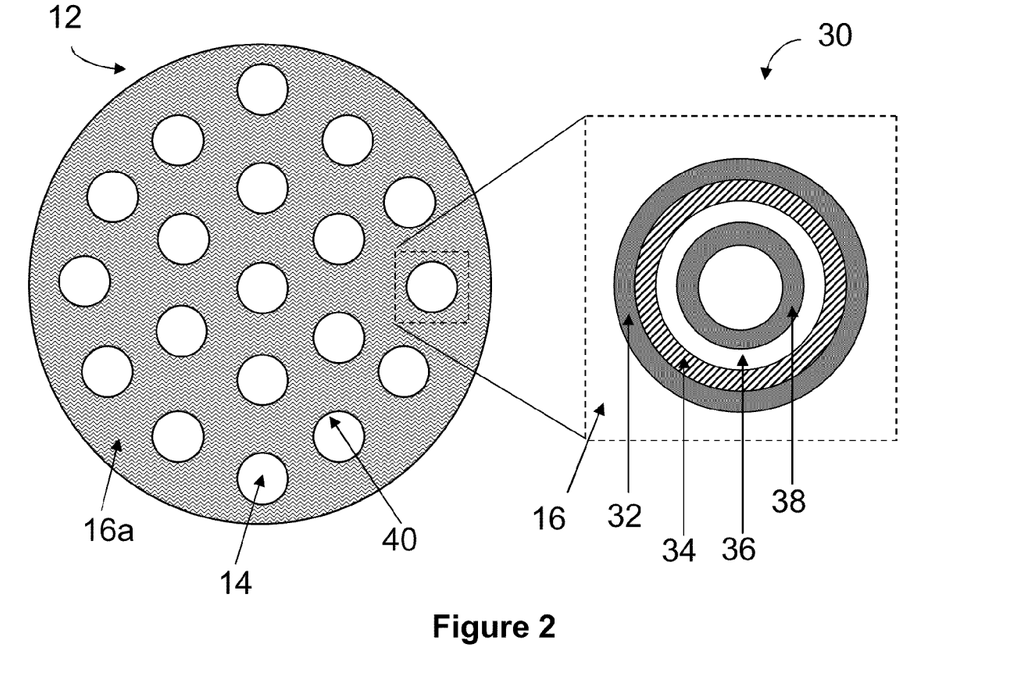
FIG. 2 illustrates an end surface of the inorganic porous support and an exploded view of an inorganic porous support channel having multiple layers coating the inner surface of the channel wall, according to one embodiment.

FIG. 2 illustrates the end surface 12 of an inorganic porous support. The exploded view 30 of a channel 14 shows a plurality of layers 32, 34, 36, 38 of porous material coating the inside of channel 14. The average pore size of each layer of porous material decreases as one progresses from the inner surface of the channel wall 40 to the outermost layer of porous material coating the channel wall. For example, porous layer 32, the first porous layer on the channel wall, has a larger average pore size than porous layer 34. Porous layer 34 has a larger average pore size than porous layer 36. Porous layer 36 has a larger average pore size than porous layer 38. Porous layer 38, the outermost porous layer, has the smallest average pore size. In some embodiments, the average pore size of porous layer 32 is less than the average pore size of the inner surface of the channel wall 40. Although four porous layers are illustrated in FIG. 2, embodiments can have one or a plurality of porous layers.

In one embodiment a hermetic coating 16a, 16b seals the end surfaces 12 and the outer curved surface 18 of the inorganic porous support. The hermetic coating 16a, only seals the porous end surfaces of the channel walls and does not block or seal the channel openings. The hermetic coating 16b seals the outer curved surface of the inorganic porous support 20 to a distance, L, from each end of the inorganic porous support 20. In some embodiments, the hermetic coating may also cover a portion of the inner surface of the channel walls 40, for example, up to and including the distance, L, from the end surface. The hermetic coating is not required on the inner surface of the channel walls and preferably there is little or no coating present on the inner surface of the channel walls. If present, the hermetic coating on the inner surface of a channel wall 40 does not have sufficient thickness to inhibit the passage of a gas stream into the channels 14; i.e. entry to and through the channel 14 is not blocked.

In one embodiment the hermetic coating is a glass, glass-ceramic, or ceramic material. In another embodiment the hermetic coating is ceramic cement. Any commercially available cement that is stable and non-reactive at a high temperature application, for example, greater than 250° C., can be used.

The hermetic coatings are applied to the inorganic porous support using any suitable technique, for example, spray coating, or dip coating. In some embodiments a firing step is required between coating applications. Some embodiments require one coating application, while other embodiments require two or more, three or more, four or more, six or more, eight or more, ten or more coating applications. The coated inorganic porous support may be fired at a temperature range of 600-1400° C. for a period of 0.5-2.0 hours between coating applications.

Another embodiment is an apparatus comprising an inorganic porous support in the form of a flow-through substrate having a porous outer curved surface, a plurality of channels extending from an inlet end to an outlet end, one or a plurality of porous layers coating the inner surfaces of the channels and a selected length; a hermetic coating sealing the inlet end and outlet end surfaces and the outer curved surface of the inorganic porous support to a selected distance from each of the end surfaces; removable fittings with a first end and second end at the inlet end and outlet end of the inorganic porous support; and graphite seals between the hermetic coating on the outer curved surface of the inorganic porous support and the first end or second end of the removable fittings.

Figure 3:
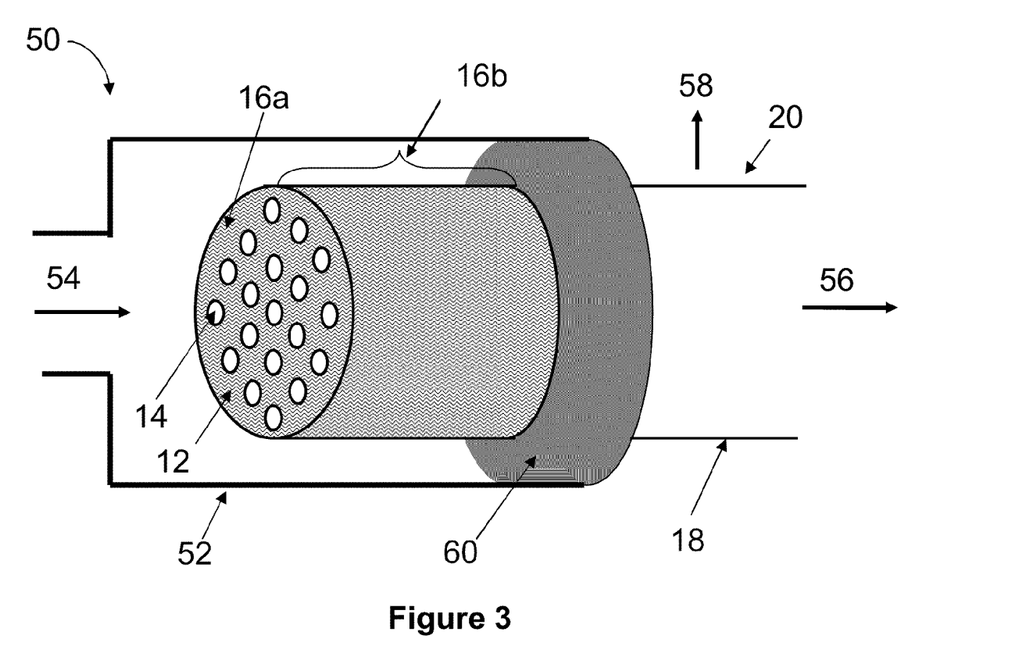
FIG. 3 illustrates an embodiment of an end coated inorganic porous support with removable fitting and graphite seal.

FIG. 3 illustrates an embodiment of an end coated inorganic porous support 50 with removable fitting 52 and a graphite seal 60. The hermetic coating 16a, 16b seals the end surface 12 and outer curved surface 18 of the inorganic porous support 20. The hermetic coating 16b extends a distance from the end surface 12 to create a sealed outer curved surface from the end surface 12 to the graphite seal 60. Also illustrated in FIG. 3 is the gas flow 54. The inlet stream 54 enters the removable fitting 52 and enters the inorganic porous support 20 through the open channels 14. The inlet gas stream 54 cannot pass through the porous outer surface of the inorganic porous support in this region from either direction (outside to inside or inside to outside) due to the hermetic coating. The gas travels through a distance to extend past the hermetically coated regions 16a, 16b, and graphite seal 60. The gas may travel through the channel, down the channel wall or a combination of both. A retentate gas 56 continues its path through the channels 14 while a permeate gas 58 passes through the porous layers, inorganic porous support walls, and non-coated outer curved surface 18 of the inorganic porous support 20.

Figure 4:
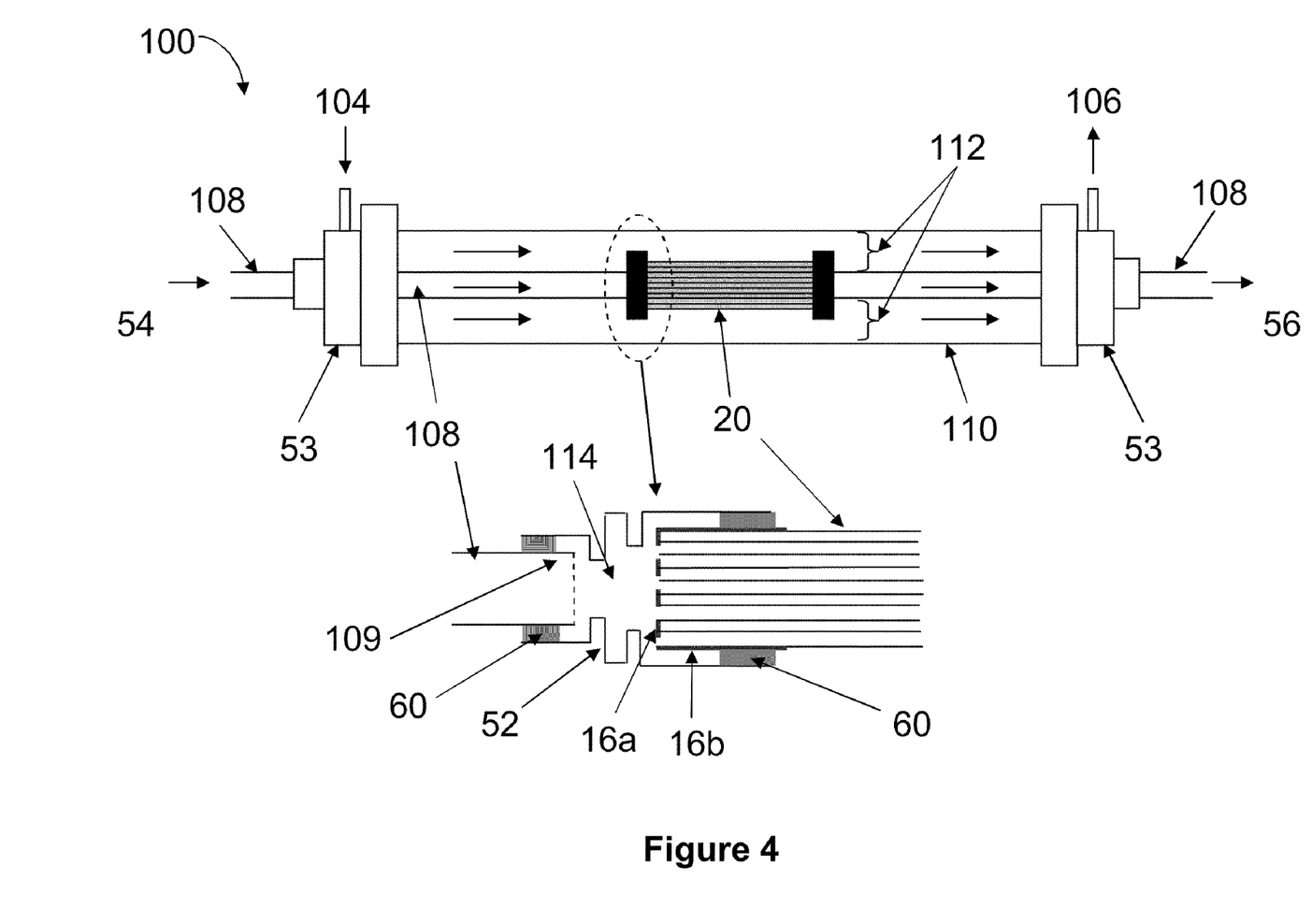
FIG. 4 illustrates a module that can be used for separating components of a gas stream.

An example module 100 is shown in FIG. 4. The inorganic porous support 20 with one or a plurality of porous layers and hermetic coating 16a, 16b sealing the inlet and outlet end surfaces and outer curved surfaces is attached to inner tubing 108 with removable fittings 52. Graphite seals 60 are used to create an airtight seal between one end of removable fitting 52 (which has a first end and a second end) and the coated surface 16b of the inorganic porous support 20, as shown in the exploded view of one end of the inorganic porous support 20. Also illustrated in the exploded view is a graphite seal 60 between inner tubing 108 and the other end of removable fitting 52.

The inorganic porous support 20, removable fittings 52, and inner tubing 108 are enclosed in larger diameter outer shell or outer tubing 110. The ends of the outer tubing 110 are sealed with appropriately sized removable fittings 53 with ports for the inlet gas stream 54, carrier gas 104, permeate gas/carrier gas mixture 106, and retentate gas 56.

Stainless steel, or dense ceramic tubing, or combinations thereof, may be used as a delivery device and/or containment for the inlet gas stream, carrier gas, permeate gas, and retentate gas. The delivery device is used for delivery of the gas stream into and out of the support, apparatus, or module. In one embodiment, the inlet gas 54 enters the inorganic porous support or module via delivery device 108, and the retentate gas 56 exits the inorganic porous support or module via delivery device 108. The delivery device may be any suitable device appropriate for the application. For exemplary purposes, FIG. 4 illustrates the delivery device as tubing 108. The delivery device is not in direct contact with the inorganic porous support face. The delivery device should be sized appropriately for any application and pressure requirements. A delivery device is also used for introduction of a carrier gas and removal of the permeate gas and/or carrier gas mixture. Removable fittings are used in the connections because they allow for flexible connections between elements of the module 100. For example, a removable fitting connected to the coated inorganic porous substrate can be easily removed to replace the coated inorganic porous substrate without damage to the coated inorganic porous substrate. Removable fittings also allow for individual elements of the module to be easily changed or replaced. One example of a removable fitting is a Swagelok® stainless steel fitting.

The module can be placed in a tube furnace with stainless steel or dense ceramic tubing 108, 110 and associated fittings 53, extending outside of the furnace region, while the entire inorganic porous support 20 with associated graphite seals 60, removable fittings 52, and end 109 of tube 108 stay inside furnace. This design enables exposure of the entire inorganic porous support 20 to be within high temperature regions, leading to better gas separation performance.

An airtight seal is advantageous between the removable fitting 52 and the coated outer curved surface 16b of the inorganic porous support. Graphite seals 60, for example, graphite ferrules, are used to create an airtight seal between the removable fitting 52 and the coated outer curved surface 16b of the inorganic porous support 20.

A further embodiment is an apparatus comprising an inorganic porous support in the form of a flow-through substrate having a porous outer curved surface, a plurality of channels extending from an inlet end to an outlet end, one or a plurality of porous layers coating the inner surfaces of the channels and a selected length; a cement sealing the inlet end and outlet end surfaces; fittings with a first end and second end at the inlet end and outlet end of the inorganic porous support; and cement seals between the outer curved surface of the inorganic porous support and the first end or second end of the fittings.

Figure 5:
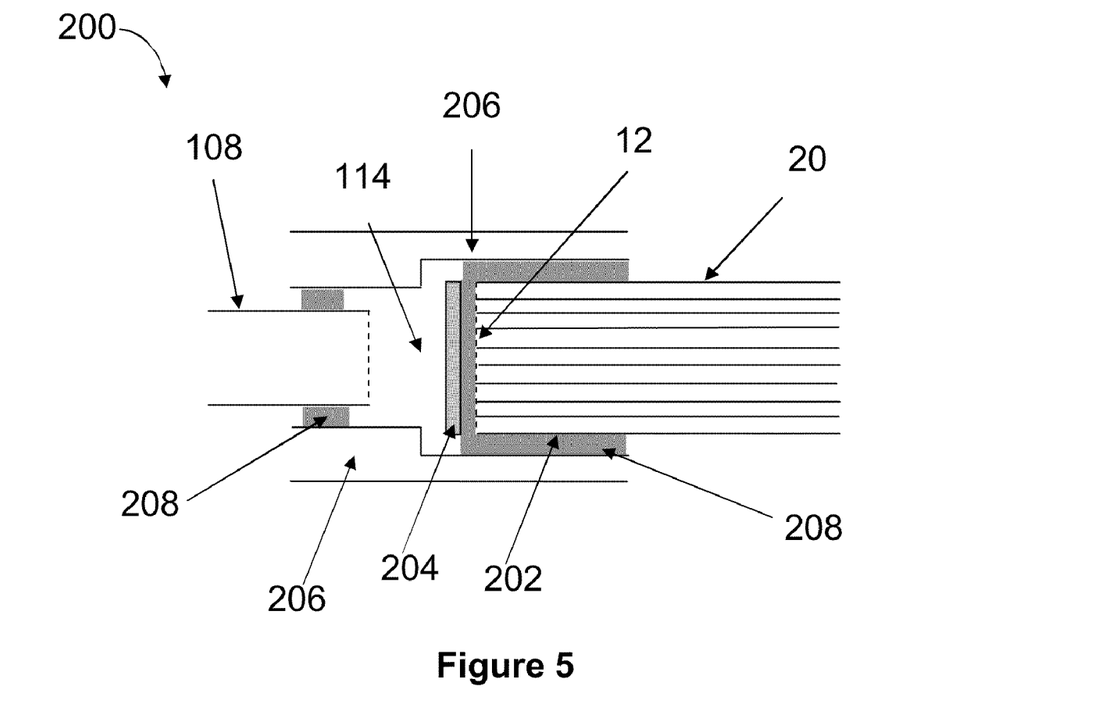
FIG. 5 illustrates one end of an inorganic porous support with permanent fitting and cement seal, according to one embodiment.
Figure 6:
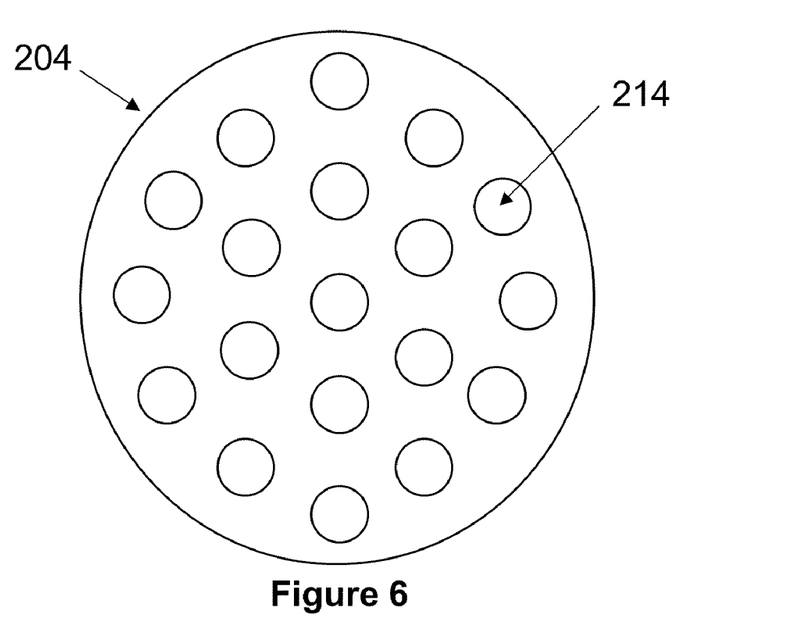
FIG. 6 illustrates an embodiment of a gas seal mask.

In one embodiment a cement end sealing structure 200 as shown in FIG. 5, is used at the inlet and outlet ends of the inorganic porous support 20. Cement 208 is used to seal the end surfaces and attach a gas seal mask 204 to the end surfaces 12. A gas seal mask 204 is placed on the end surfaces 12 of the inorganic porous support 20 as illustrated in FIG. 5. The gas seal mask 204 with openings 214 corresponding to the channels 14 on end surfaces 12 are shown in FIG. 6. The gas seal mask 204 can be the sealing material as described herein. In other embodiments the gas seal mask 204 can be a piece fabricated from a material that can withstand the operating temperatures used in the separation process, for example, metal, glass, or ceramic. The gas seal mask 204 has the same diameter as the inorganic porous support 20 and the openings 214 through the gas seal mask correspond to the channels 14 in the inorganic porous support 20 so that gas flowing through the gas seal mask 204 into the inorganic porous support channels 14 is not impeded. Fitting 206, with larger diameter than the inorganic porous support 20, and cement 208 are used to assemble the end sealing structure 200. The outer curved surface of the inorganic porous support 20 is hermetically sealed at the interface 202 with cement 208 placed between the inorganic porous support 20 and the fitting 206. The fitting can be made from any suitable non porous material, for example, dense alumina, metal, or dense ceramic. The fitting can be any suitable shape, for example, a round tube. The fitting can also be connected to a delivery device, for example, a tube to further attachments. The cement 208 will also be used to assemble the delivery device to the fitting. The delivery device may also be integrated into the fitting with no cement seal required to form one piece capable of accepting a removable fitting for further attachments. All fittings connected with the cement are permanent fittings. The free end of the delivery device, shown a tube 108 in FIG. 5, can accept removable fittings for further attachments.

An example cement that may be used is Resbond 920 which is commercially available and can be used up to 1600° C. High temperature firing of the cement can result in stronger bonding of the cement to the surfaces. Cement end sealing allows a room temperature cure, room temperature to 1600° C. application, and little to no contamination of porous layers with cement.

A method of separating components of a gas stream comprising any of the embodiments described above, introducing a feed gas into the inorganic porous support via the delivery device; collecting a retentate gas; and collecting a permeate gas, wherein the permeate gas has passed through a non-coated portion of the outer curved surface of the inorganic porous support. Exemplary gas components that can be separated include, for example $H_2$, $CO_2$, $CH_4$, $N_2$, and Ar.

Pressure is the driving force for the gas separation. The inlet gas stream 54 is at a higher pressure than the pressure outside the inorganic porous substrate. This forces the gas to travel through the porous layers, channel walls, and non-coated porous outer surface of the inorganic porous substrate.

During the separation process, the inlet, or feed gas stream 54 travels through the delivery device 108 to the channels 14 of the inorganic porous support 20. Permeable gas molecules in the inlet gas stream 54 flow through the one or a plurality of porous layers, channel walls, and then the non-coated porous outer surface 18 of the inorganic porous support 20 to the space 112 contained by an enclosure or outer tubing 110 (see FIG. 4). A carrier gas 104 may be introduced into the outer tubing 110 and space 112 to carry the permeable gas out of the module 100. The balance of gas molecules, the retentate gas 56, pass through the channels of the inorganic porous support 20, and exit the module 100.

In an example separation process, an inlet gas stream 54 comprises gas molecules A and B. Permeable gas molecules A flow through the porous layers, channel walls and finally the non-coated porous outer surface. The balance of the gas molecules B pass through the channels of the inorganic porous support and exit the module. Depending on the gas mixture, the material of the porous layer and the temperature, some B molecules may pass through the porous layer, channel walls and non-coated porous outer surface of the support and/or some A molecules may travel down the open channel and exit the module. The permeate gas 58 may contain a mixture of A and B molecules, but the concentration of B molecules in the permeate mixture will be less than the inlet gas stream 54. The retentate gas 56 may contain a mixture of A and B molecules, but the concentration of A molecules in the retentate gas will be less than the inlet gas stream 54.

The module described herein can be used for selective separation of one gas molecule from a feed gas or gas stream. Example gas streams include $N_2/H_2$, $N_2/CO_2$, $N_2/O_2$, $Ar/H_2$, $H_2/CH_4/CO_2$, and CH4/CO2. The inlet gas stream 54 may also contain another phase, such as a solid particulate in a gas, or droplets of liquid in a gas stream. The module can also be used in an online chemical reaction at high temperatures, with the reaction and separation occurring at the same time.

The gas separation may take place under any appropriate conditions. The feed gas should not be damaging to the hermetic sealing material, cement, or porous layers. The module 100, with extended tubing, as shown in FIG. 4 is applicable, for example, for use at temperatures higher than 250° C. and may be used at temperatures up to 400° C., 600° C., 1000° C., and 1600° C. One example is the separation of $H_2$ from $CO_2$ at 400° C.-600° C. The module may also be used at room temperature.

The paragraphs above have described a module 100 in which the inorganic porous substrate 20 had channel walls that were coated with one or a plurality of porous layers before the module was assembled with outer tubing 110 as shown in FIG. 4. However, in another embodiment, an inorganic porous substrate 20 with no coating on the channel walls can be sealed as described above, fitted with removable fittings 52 as shown in exploded view of FIG. 4 and placed within an enclosure or outer tubing 110 which has removable fittings 53. Once the assembly is completed, one can pass a vapor of a porous material through the inorganic porous support 20 to form a porous layer 32 on the inorganic porous support 20. The method described above can also be used to place additional porous layers 34, 36, 38 inside the channels 14 of the inorganic porous support 20 to enhance gas separation performance, particularly gas selectivity.

In one embodiment, a feed gas stream containing silica precursor vapor is introduced into the channels 14 while the entire inorganic porous support 20 is exposed to high temperature (400-600° C.), while a carrier gas flows through the space 112 contained by the outer tubing 110. A silica membrane is deposited on the inner surface of the channel walls 40 after decomposition of the silica precursor. In another embodiment, a $H_2$-selective silica layer is deposited on the inner surface of the channel walls 40 and separation performance is evaluated at 600° C. using the existing module arrangement. In one embodiment, the porous layer deposition can be stopped temporarily and a gas mixture to be separated can be introduced to the module so the separation performance can be evaluated with the same gas separation process as described herein. The deposition process can be resumed after separation performance evaluation. The deposition and gas separation process can take place at the same temperature without the need to cool, disassemble the module, reassemble the module, and heat to the required separation temperature. Maintaining the temperature saves energy and time.

EXAMPLE 1

This example has two layers of porous alumina on the inner surfaces of an alumina porous support, and a ceramic seal coating on both end surfaces and the outer curved surface for a distance from end surfaces. The alumina porous support used in this example was made of alpha-alumina with an outer diameter of 9.2 mm and a length of 80-150 mm comprising 19 rounded channels of an average diameter of 0.75 mm being uniformly distributed over the cross-sectional area. The porous support has a median pore size of 8.7 microns and porosity of 43.5%, as measured by mercury porosimetry. The two alumina porous layers were made of alpha-alumina. The first layer having a thickness of 30-50 µm and a median pore size of 0.8 µm. The second layer having a thickness of 10-20 µm and a median pore size of 0.1 µm.

A commercial ceramic slurry (Duncan envision glaze, clear IN1001) was used for the ceramic seal coating. Before spraying, the original slurry was diluted with an equal weight of deionized (D.I.) water. The exterior surface of the alumina porous support was wrapped with Teflon® tape leaving a length of 10 mm at two ends unwrapped. A commercial AC-20 airbrush from Paasche Airbrush Company with size of H-5 Color Part and HC-5 Aircap was used to spray the slurry onto the target surface, which includes end surfaces and outer curved surfaces of both ends of the alumina porous support that were not protected by the Teflon® tape. The air pressure was set at 35 psi. After drying at ambient condition for 2 hours, the alumina porous supports were placed in a box furnace and heated to 1013° C. for 0.5 hours with a heating rate of 120° C. per hour. The cooling rate was 120° C. per hour. The same process of spraying and firing was then repeated.

EXAMPLE 2

The alumina porous support having three porous alumina layers coating the inner surfaces of the alumina support was prepared using the technique described in Example 1. A glass-based seal coating was applied on both end surfaces and outer curved surfaces of the alumina porous support, also described in Example 1.

The first porous layer is alpha-alumina with a median pore size of 0.8 microns and a thickness of 30-50 microns. The second porous layer is alpha-alumina with a median pore size of 0.1 microns and a thickness of 5-20 microns. The third porous layer is gamma-alumina with a Barrett-Joyner-Halenda (BJH) desorption pore diameter of 4 nanometers and a thickness of 2 microns.

A glass-based sealing material slurry containing glass powder, filler, binder, and organic solvent was sprayed on two end portions including end surfaces and outer curved surfaces with a length of 10 mm in an axial direction from the end surface of the alumina porous support. The seal coating was fired at 800° C. for 1 hour.

EXAMPLE 3

The alumina porous support having three porous alumina layers and one porous silica layer coating the inner surfaces of the alumina support was prepared using the technique described in Example 1. A ceramic seal coating was applied on both end surfaces and outer curved surfaces of the alumina porous support, also described in Example 1.

The first porous layer is alpha-alumina with a median pore size of 0.8 microns and a thickness of 30-50 microns. The second layer is alpha-alumina with a median pore size of 0.1 microns and a thickness of 5-20 microns. The third layer is gamma-alumina with a BJH desorption pore diameter of 4 nanometers and thickness of 2 microns. The top layer of porous silica has a pore size of around 0.3 nanometers and thickness of 30-100 nanometers. A ceramic seal coating covers the two end portions including end flat surface and outer curved surface with a length of 10 mm in an axial direction from the end of the porous support.

EXAMPLE 4

The alumina porous support having two porous alumina layers and one porous zeolite layer coating the inner surfaces of the alumina porous support was prepared using the technique described in Example 1. A ceramic seal coating was applied on both end surfaces and outer curved surfaces of the alumina porous support, also described in Example 1.

The first porous layer is alpha-alumina with a median pore size of 0.8 microns and a thickness of 30-50 microns. The second layer is alpha-alumina with a median pore size of 0.1 microns and a thickness of 5-20 microns. The top layer of zeolite is dense, the pores of a zeolite layer are from its lattice channels, usually in the range of 0.3-0.8 nanometers for gas separation. A ceramic seal coating covers the two end portions including end surface and outer curved surfaces with a length of 10 mm in an axial direction from the end surface of the porous support.

EXAMPLE 5

The alumina porous support as described in Example 1 was used. Commercial ceramic adhesive Resbond 920 (cement) was used to seal the two ends. The cement paste was prepared by mixing the Resbond 920 powder with 18 volume percent of water. Before applying the paste to the surfaces, the surfaces were immersed into water for several minutes. The end surfaces were coated with the cement paste, and excess cement paste was blown out of the inorganic porous substrate using air. A gas seal mask was sealed to each end of the support and the cement was cured. The surfaces were immersed in water for several minutes again; the outer curved surface was coated with cement paste and assembled with the fittings. After connecting all parts with the cement, the sealed porous support was cured at room temperature for 24 hours.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used in the specification and claims are to be understood as being modified in all instances by the term "about," whether or not so stated. It should also be understood that the precise numerical values used in the specification and claims form additional embodiments of the invention.

We claim:
1. An article comprising:
an inorganic porous support having a selected length, an inlet end, an outlet end, and a porous outer curved surface between the inlet and outlet ends,
wherein the inorganic porous support is in the form of a flow-through substrate having a plurality of channels with inner surfaces extending from the inlet end to the outlet end,
one or a plurality of layers of a porous material coating the inner surfaces of the channels of the inorganic porous support;
a hermetic coating sealing the inlet end and the outlet end surfaces of the inorganic porous support, wherein the hermetic coating is a ceramic cement; and a hermetic coating sealing the outer curved surface of the inorganic porous support to a selected distance from each of the inlet end and outlet end surfaces, wherein the hermetic coating is a ceramic cement.

2. The article of claim 1, wherein the inorganic porous support is in the form of a honeycomb.

3. The article of claim 1, wherein the inorganic porous support comprises alumina, cordierite, mullite, titania, zirconia, ceria or combinations thereof.

4. The article of claim 2, wherein the inorganic porous support comprises alumina.

5. The article of claim 1, wherein the one or a plurality of porous layers comprises alumina, silica, zeolite, titania, zirconia, mullite, cordierite, metal, perovskite, palladium, ceria, or combinations thereof.

6. The article of claim 1, wherein when a plurality of layers are coating the inner surfaces of the channels, the plurality of layers have a decreasing average pore size from the channel wall surfaces to the outermost coating layer.

7. The article of claim 1, further comprising gas seal masks attached to the inlet and outlet end surfaces of the inorganic porous support, the gas seal masks comprising openings corresponding to the plurality of channels in the inorganic porous support.

8. The article of claim 7, wherein the gas seal masks are bounded to the inorganic support with ceramic cement and fabricated from metal, glass, or ceramic.

9. The article of claim 1, wherein the hermetic coating seals the outer curved surface of the inorganic porous support to a distance of 0.5 centimeters to 3 centimeters from each of the inlet end and outlet end surfaces.

10. The article of claim 1, wherein the hermetic coating seals the outer curved surface of the inorganic porous support to a distance of 1 centimeter to 1.5 centimeters from each of the inlet end and outlet end surfaces.

11. An apparatus comprising:
an inorganic porous support in the form of a flow-through substrate having a porous outer curved surface, a plurality of channels extending from an inlet end to an outlet end, one or a plurality of porous layers coating the inner surfaces of the channels and a selected length;
a hermetic coating sealing the inlet end and outlet end surfaces and the outer curved surface of the inorganic porous support to a selected distance from each of the end surfaces;
removable fittings with a first end and second end connected to the inlet end and outlet end of the inorganic porous support; and graphite seals between the hermetic coating on the outer curved surface of the inorganic porous support and the first end or second end of the removable fittings.

12. An apparatus of claim 11, further comprising a delivery device connected to a fitting at the inlet end of the inorganic porous support.

13. An apparatus of claim 11, provided within an enclosure comprising at least one gas flow inlet and at least one gas flow outlet.

14. An apparatus comprising:
an inorganic porous support in the form of a flow-through substrate having a porous outer curved surface, a plurality of channels extending from an inlet end to an outlet end, one or a plurality of porous layers coating the inner surfaces of the channels and a selected length;
a cement sealing the inlet end and outlet end surfaces;
fittings with a first end and second end connected to the inlet end and outlet end of the inorganic porous support; and
cement seals between the outer curved surface of the inorganic porous support and the first end or second end of the fittings.

15. An apparatus of claim 14, further comprising a gas seal mask applied to the cement seal on the inlet end and outlet end of the inorganic porous support.

16. A apparatus of claim 15, further comprising a delivery device connected to a fitting at the inlet end of the inorganic porous support.

17. An apparatus of claim 14, provided within an enclosure comprising at least one gas flow inlet and at least one gas flow outlet.

18. A method of separating components of a gas stream comprising:
providing an apparatus of claim 12;
introducing a feed gas into the inorganic porous support via the delivery device;
collecting a retentate gas; and
collecting a permeate gas,
wherein the permeate gas has passed through a non-coated portion of the the outer curved surface of the inorganic porous support.

19. A method of separating components of a gas stream comprising:
providing an apparatus of claim 16;
introducing a feed gas into the inorganic porous support via the delivery device;
collecting a retentate gas; and
collecting a permeate gas,
wherein the permeate gas has passed through a non-coated portion of the the outer curved surface of the inorganic porous support.

20. A method according to claim 18, wherein separating the components of a gas stream occurs at a temperature above 250° C.

21. A method according to claim 19, wherein separating the components of a gas stream occurs at a temperature above 250° C.

* * * * *